UNITED STATES PATENT OFFICE.

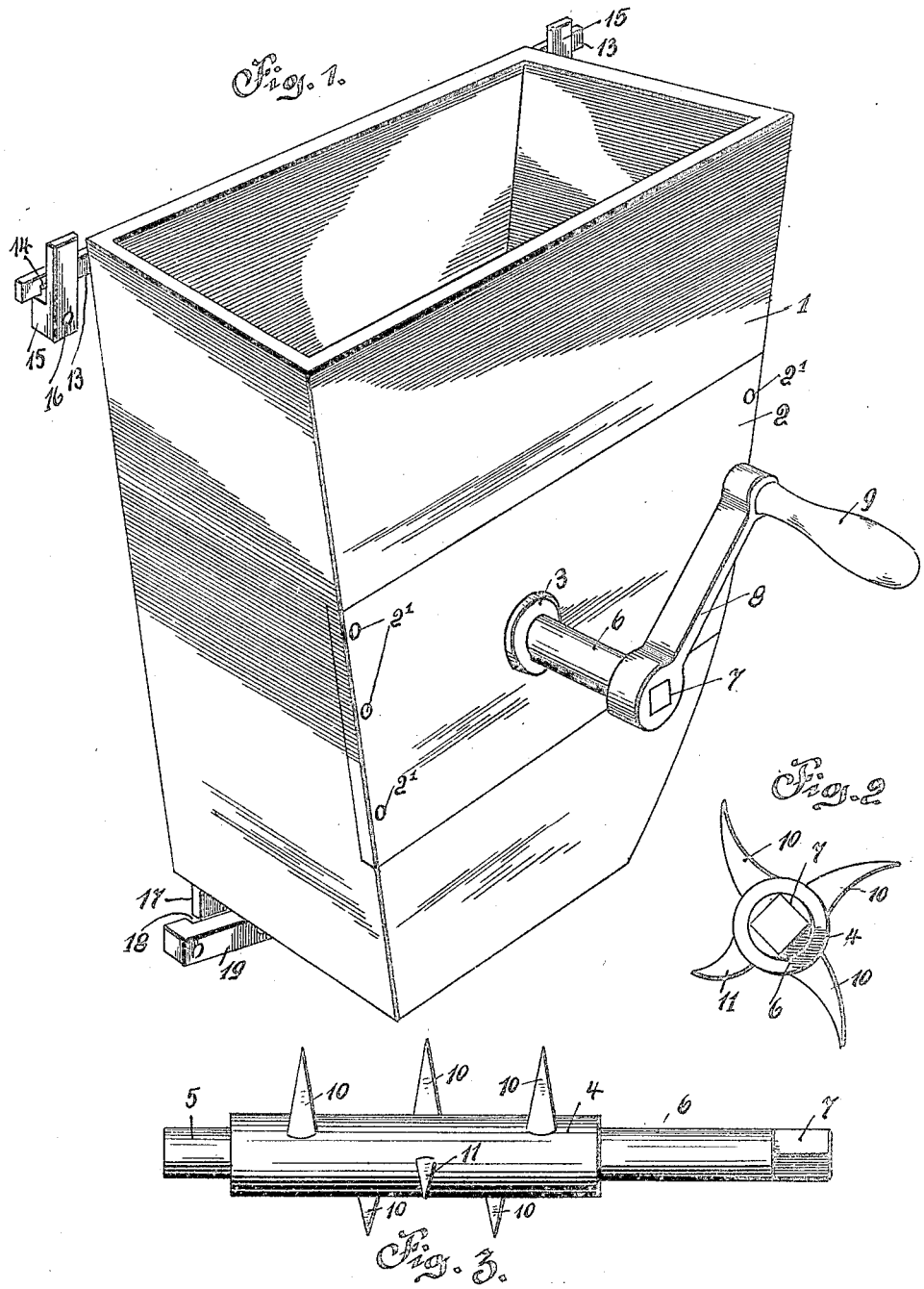

OTTO HARSCH, OF SWISSVALE, PENNSYLVANIA.

ICE-CRUSHER.

No. 813,149.     Specification of Letters Patent.      Patented Feb. 20, 1906.

Application filed March 8, 1905. Serial No. 249,061.

*To all whom it may concern:*

Be it known that I, OTTO HARSCH, a citizen of the United States of America, residing at Swissvale, in the county of Allegheny and State of Pennsylvania, have invented certain new and useful Improvements in Ice-Crushers, of which the following is a specification, reference being had therein to the accompanying drawings.

This invention relates to ice-crushers, and has for its object to provide an ice-crusher of novel construction that is adapted to be attached to an ice-wagon for the purpose of providing a ready means of crushing ice upon the wagon to be delivered to customers.

Briefly described, my invention comprises a substantially rectangular receptacle providing means for detatchably securing it in position at any convenient place upon an ice-wagon, the said receptacle being also provided with a rotary shaft furnished with projecting teeth within the receptacle and furnished with a crank and handle without the receptacle by means of which the shaft may be turned to crush the ice.

Referring to the accompanying drawings, wherein I have illustrated my improvement, Figure 1 is a perspective view of the complete apparatus. Fig. 2 is an end elevation of the ice-crushing shaft with the crank and handle removed, and Fig. 3 is a side elevation of the same.

The ice-receptacle comprises a substantially rectangular box or hopper, which tapers slightly from top toward the bottom at one end and at a point adjacent to the bottom.

The receptacle 1 is provided with a removable panel 2 at one side, which panel carries one of the bearings 3 of a rotary shaft 4, which is journaled in said bearing and in a bearing upon the other side 5 of the receptacle, the last-named bearing not being shown. The ends of the rotary shaft 4 are reduced, as shown at 5 and 6, and the end 6, which projects through the bearing 3, is squared at 7 for the reception of a crank 8, and the said crank carries a handle 9, by means of which the crank can be turned, thereby rotating the shaft. Within the receptacle the shaft 4 is provided with a plurality of teeth 10, which are arranged in staggered relation upon the shaft, and is also provided with a tooth 11. All of the prongs 10 and 11 are slightly curved and are of tapering form from their bases to their points, the purpose of the shorter prong being to permit the ice at one stage in the revolution of the shaft to approach more closely to the shaft, so that the longer prongs will be afforded a better opportunity to strike the ice than if all the prongs were of the same length, the ice, when the shorter prong is uppermost, sinking down further into the receptacle than when any of the longer prongs are uppermost on the shaft.

The one side of the receptacle 1 is provided near its top edge with a cleat 13, which has a notch 14 near each end, and L-shaped brackets 15 are provided, which are pierced at 16 for the passage of bolts, by which the brackets are secured at any desired point upon the wagon, the side of the receptacle which carries the cleat 13 being prolonged below the bottom of the receptacle, as indicated at 17, and this prolongation of the side of the receptacle fits into a slot 18 in a bar 19, which is also secured to the wagon at a proper distance below the brackets 15, and the said brackets and the bar 19 serve to hold the receptacle securely in place in an upright position, the receptacle being, as can be readily understood, easily removed from the brackets and the bar 19 when it is desired to remove the receptacle for any desired purpose.

The panel 2 is removed from the side of the receptacle, being secured in position by screws 2', and the panel is of such width that the shaft 4 can be readily drawn out from the box through the panel-opening when it is desired to cleanse the receptacle or to remove the shaft for any purpose.

The operation of the device described above is as follows: The receptacle being placed in position by passing the extended end 17 of the side of the same into the slot 18 in the bar 19, and also by passing the cleat 13 behind the upwardly-extending arms of the brackets 15 and allowing the receptacle to descend until the notches 14 of the cleat engage the lower horizontal portion of the brackets, the receptacle will be thereby firmly fixed in position upon the wagon, the location of the same being preferably at a position near the rear of the wagon where it will be easy of access. The ice to be crushed is placed in the receptacle, the shaft 4 being turned until the short tooth 11 is uppermost. The shaft is then revolved by turning the crank 8, and the longer teeth 10, coming into contact with the ice, will break off pieces of the same, which will fall out of the bottom of the receptacle, where they can be received in a suitable vessel, such as a box or bucket.

If at any time it is desired to clean the receptacle or to remove the shaft for the purpose of sharpening the teeth or making repairs to the same, the screws 2' are removed, and the panel 2 and the shaft, with its attached parts, are removed. The replacement of the shaft and the panel is accomplished by the reverse operation, as the entire device is, as will be observed, of exceedingly simple construction and strong and durable, being therefore not liable to become damaged by the rough usage to which it is necessarily subjected.

What I claim, and desire to secure by Letters Patent, is—

1. In a device of the character described, the combination of a receptacle having one side prolonged below the bottom of the receptacle, and a cleat carried by the receptacle near its top edge, with a slotted bar adapted to be secured to a stationary support, said slotted bar receiving the prolonged side of said receptacle and brackets adapted to be attached to said stationary support to receive said cleat.

2. In a device of the character described, the combination with a receptacle, of a shaft mounted in bearings carried by the sides of the receptacle, tapering pointed prongs carried by said shaft, one of said prongs being of less length than all the other of said prongs and disposed in circumferential alinement with one of the longer prongs, and a crank and handle carried by said shaft, substantially as described.

In testimony whereof I affix my signature in the presence of two witnesses.

OTTO HARSCH.

Witnesses:
K. H. BUTLER,
JAS. V. MCMASTERS.